(12) United States Patent
Chandrasekaran

(10) Patent No.: US 7,468,649 B2
(45) Date of Patent: Dec. 23, 2008

(54) ISOLATED POWER CONVERTER

(75) Inventor: Sriram Chandrasekaran, Round Rock, TX (US)

(73) Assignee: Flextronics International USA, Inc., San Jose, CA (US)

( * ) Notice: Subject to any disclaimer, the term of this patent is extended or adjusted under 35 U.S.C. 154(b) by 0 days.

(21) Appl. No.: 11/686,140

(22) Filed: Mar. 14, 2007

(65) Prior Publication Data

US 2008/0224812 A1  Sep. 18, 2008

(51) Int. Cl.
*H01F 27/28* (2006.01)
*H01F 38/28* (2006.01)
*H01F 27/34* (2006.01)

(52) U.S. Cl. .................. 336/212; 336/180; 336/182; 323/358; 363/125

(58) Field of Classification Search .......... 336/212, 336/180, 182; 323/358, 359, 361; 363/125
See application file for complete search history.

(56) References Cited

U.S. PATENT DOCUMENTS

| | | | |
|---|---|---|---|
| 3,553,620 | A | 1/1971 | Cielo et al. |
| 5,555,494 | A | 9/1996 | Morris |
| 6,094,038 | A | 7/2000 | Lethellier |
| 6,147,886 | A | 11/2000 | Wittenbreder |
| 6,362,986 | B1 | 3/2002 | Schultz et al. |
| 6,549,436 | B1 * | 4/2003 | Sun .................. 363/44 |
| 6,775,159 | B2 | 8/2004 | Webb et al. |
| 6,873,237 | B2 | 3/2005 | Chandrasekaran et al. |
| 6,944,033 | B1 | 9/2005 | Xu et al. |
| 6,980,077 | B1 | 12/2005 | Chandrasekaran et al. |
| 6,982,887 | B2 | 1/2006 | Batarseh et al. |
| 7,012,414 | B1 | 3/2006 | Mehrotra et al. |
| 7,034,647 | B2 | 4/2006 | Yan et al. |
| 7,046,523 | B2 | 5/2006 | Sun et al. |
| 7,176,662 | B2 | 2/2007 | Chandrasekaran |
| 2004/0034555 | A1 | 2/2004 | Dismukes et al. |
| 2004/0148047 | A1 | 7/2004 | Dismukes et al. |
| 2005/0024179 | A1 | 2/2005 | Chandrasekaran et al. |

(Continued)

OTHER PUBLICATIONS

P. Xu et al., "Design and Performance Evaluation of Multi-Channel Interleaving Quasi-Square-Wave Buck Voltage Regulator Module," *HFPC*, pp. 82-88 (2000).

(Continued)

*Primary Examiner*—Anh T Mai
(74) *Attorney, Agent, or Firm*—Slater & Matsil, L.L.P.

(57) ABSTRACT

There is provided an isolated power converter. More particularly, in one embodiment, there is provided a power converter including a first magnetic core having a primary winding and a secondary winding around the first magnetic core. The power converter also includes a second magnetic core having a first leg, a second leg coupled to the first leg, and a third leg coupled to the first and second legs, wherein a part of the third leg is equidistant from the first leg and the second leg. The power converter also has a first winding encircling the first leg, a first end of the first winding coupled to the secondary winding, a second winding encircling the second leg, a first end of the second winding coupled to the secondary winding, and a third winding encircling the third leg, a first end of the third winding coupled to a second end of the first wining and to a second end of the second winding.

11 Claims, 10 Drawing Sheets

U.S. PATENT DOCUMENTS

2006/0187684 A1     8/2006    Chandrasekaran et al.
2006/0237968 A1    10/2006    Chandrasekaran

OTHER PUBLICATIONS

R. Lenk, "Introduction to the Tapped Buck Converter," *HFPC 2000 Proceedings*, pp. 155-166 (2000).

D. Maksimovic et al., "Switching Converters With Wide DC Conversion Range," *IEEE Transactions on Power Electronics*, vol. 6, No. 1, pp. 151-157 (Jan. 1991).

M. Rico et al., "Static and Dynamic Modeling of Tapped-Inductor DC-to-DC Converters," *IEEE PESC*, pp. 281-288 (1987).

R. D. Middlebrook, "Transformerless DC-to-DC Converters With Large Conversion Ratios," *IEEE Transactions on Power Electronics*, pp. 484-488 (Oct. 1988).

J. Wei et al., "Comparison of Three Topology Candidates for 12V VRM," *IEEE APEC*, pp. 245-251 (2000).

A. Pietkiewicz et al. "Coupled-Inductor Current-Doubler Topology In Phase-Shifted Full-Bridge DC-DC Converter," *IEEE*, pp. 41-48 (1998).

Chen et al., "Integrated Planar Inductor Scheme for Multi-Module Interleaved Quasi-Square-Wave (QSW) DC/DC Converter," *IEEE*, pp. 759-762 (1999).

Wong et al., "Investigating Coupling Inductors in the Interleaving QSW VRM," *IEEE*, pp. 973-978 (2000).

\* cited by examiner

US 7,468,649 B2

ISOLATED POWER CONVERTER

BACKGROUND

Most people are aware that electrical devices generally require electrical power to operate. Electrical power requirements often vary greatly, however, between different types of electrical devices. For example, even though both a lamp and a computer plug into the same wall outlet, these two devices may operate at different electrical voltages. To make this possible, many electrical devices employ power converters that control, condition, or convert power between the source and the load. For example, a power converter in a computer may receive power from a wall outlet at one voltage level and convert that power to another voltage level suitable to power the computer. In this way, power converters enable a great variety of electrical devices to receive power from a single standardized power source (e.g., a wall outlet, a car engine, etc.). One type of power converter, known as an isolated power converter, employs a transformer (amongst other components) to perform this power conversion.

SUMMARY

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

There is provided an isolated power converter. More particularly, in one embodiment, there is provided a power converter including a first magnetic core having a primary winding and a secondary winding around the first magnetic core. The power converter also includes a second magnetic core having a first leg, a second leg coupled to the first leg, and a third leg coupled to the first and second legs, wherein a part of the third leg is equidistant from the first leg and the second leg. The second magnetic core has a first winding encircling the first leg, a first end of the first winding coupled to the secondary winding, a second winding encircling the second leg, a first end of the second winding coupled to the secondary winding, and a third winding encircling the third leg, a fired end of the third winding coupled to a second end of the first winding and to a second end of the second winding.

DESCRIPTION OF DRAWINGS

Like reference symbols in the various drawings indicate like elements.

DETAILED DESCRIPTION

Figure 1:
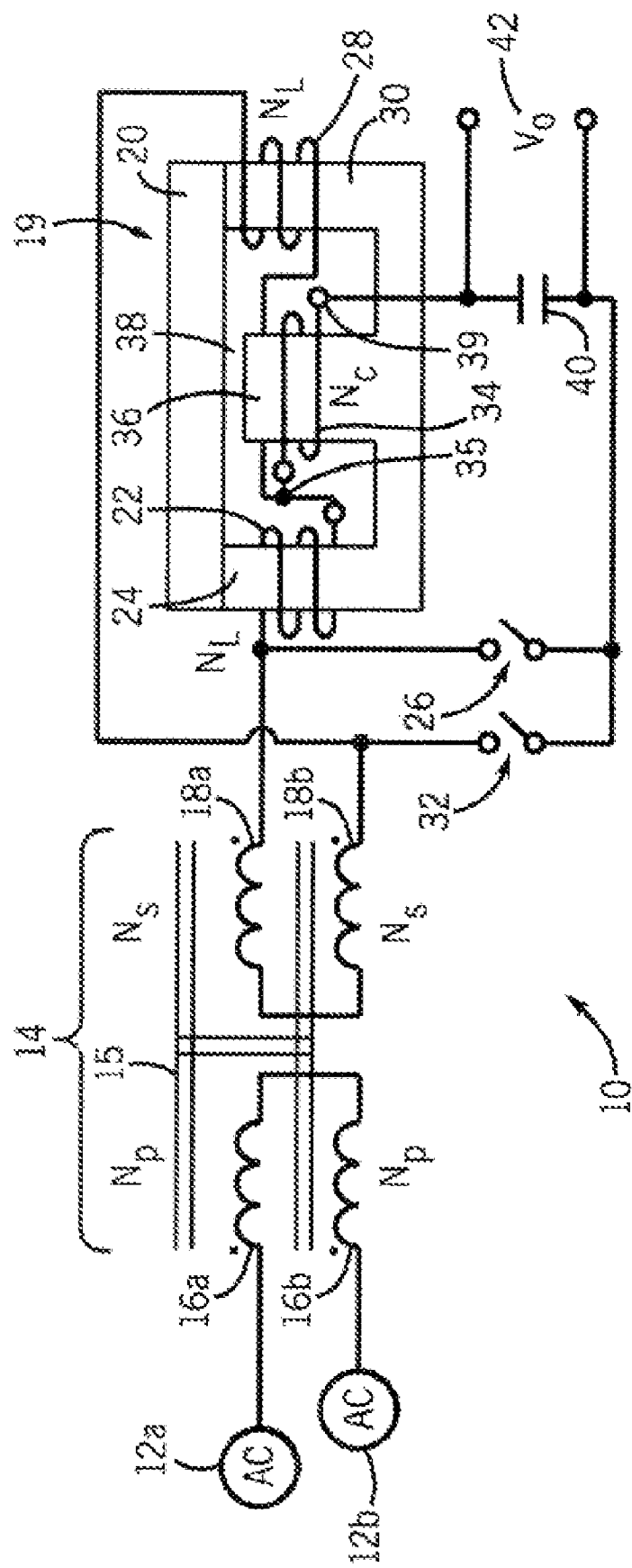
FIG. 1 is a diagram of an exemplary isolated power converter employing an inductor assembly in accordance with one embodiment.

With reference to FIG. 1, a diagram of an exemplary isolated power converter 10 employing an inductor assembly in accordance with one embodiment is illustrated. In one embodiment, isolated power converter 10 is an alternating current ("AC") to direct current ("DC") converter. In alternative embodiments, however, the power converter may perform other suitable forms of the power conversion.

As illustrated, power converter 10 may include one or more AC sources 12*a* and 12*b*. AC sources 12 provide an electrical current whose magnitude and direction vary cyclically. For example, in one embodiment, AC sources 12 provide an AC signal with a sine wave waveform. In other embodiments, AC sources 12 may provide an AC signal with a square waveform, a sawtooth a waveform, or a triangle waveform. It will be appreciated, however, that these embodiments are not intended to be exclusive. As such, in alternate embodiments, AC signals with other suitable AC waveforms, such as the quasi-square wave described below, may be employed.

AC sources 12 may generate the AC signals themselves, or they may receive and/or condition AC signals from another source. For example, as will be described further below, AC sources 12 may draw their power from a regulated source, such as a wall outlet, from another power converter, such as a full bridge converter (see discussion of FIG. 4), or from another suitable AC source 12. Further, in one embodiment, AC sources 12*a* and 12*b* are configured to provide AC signals that are shifted in phase from each other. For example, the AC power provided by AC source 12*a* may be 180 degrees out-of-phase with the AC power provided by AC source 12*b*. As will be described further below, in one embodiment, employing multiple AC signals that are shifted in phase from each other enables power converter 10 to provide an output current with reduced switching ripple.

AC source 12 may be coupled to a transformer 14 that includes a magnetic core 15, primary windings 16, and secondary windings 18. As those of ordinary skill in the art will appreciate, transformer 14 transfers energy from primary windings 16 to secondary windings 18 via a magnetic coupling between the two windings along magnetic core 15. In various embodiments, magnetic core 15 may comprise steel, iron, ferrite, or other suitable core materials. As shown in FIG. 1, in at least one embodiment, transformer 14 includes two sets of primary windings 16a and 16b and two sets of secondary windings 18a and 18b coupled to or corresponding to AC sources 12a and 12b. Primary windings 16 may comprise copper wire, aluminum wire, gold wire, etc.

Primary windings 16 may be wrapped around or encircle the magnetic core 15 for a suitable number of turns, Np, and secondary windings 18 may be wrapped round or encircle magnetic core 15 for a suitable number of turns, Ns. For the purposes of this document, a winding or wire is encircling or wrapped around a structure, such as a magnetic core, if that winding or wire traverses at least partially around the surface of the structure. For example, a winding is considered to be wrapped around a magnetic core if a current through the winding induces a flux in the magnetic core.

The voltage generated in secondary windings 18 will be a function of the voltage at primary windings 16 multiplied by the ratio Ns/Np. For example, if Ns=1 and Np=10, then 400 volts ("V") on primary windings 16 will generate roughly 40V on second windings 18. Of course, as the total power cannot change, the current in secondary windings 18 will be roughly ten times the current in primary windings (i.e., Np/Ns). It will be appreciated, however, that winding resistance, leakage effects, induced eddy currents, and a variety of other types of losses will affect the power transfer across transformer 14 thereby reducing the actual voltage and/or current in secondary windings 18 from the ideal (i.e., 40V).

Secondary windings 18 may be coupled to an inductor assembly 19, which includes a magnetic core 20. As with magnetic core 15 of transformer 14, magnetic core 20 may be comprised of any suitable core material, including but not limited to steel, ferrite, or iron. Magnetic core 20 illustrated in FIG. 1 is an E-I core, names as such due to its shape (i.e., "I" shaped core geometry fastened on top of an "E" shaped core geometry). An E-E core (two E-shaped cores facing each other) geometry may also be employed as the magnetic core 20. In addition, in alternate embodiments, such as the exemplar one described below with regard to FIG. 11, other suitable core geometries may be employed.

In the illustrated configuration, secondary winding 18a is coupled to a first end of a first winding 22 that is wrapped around a first leg 24 of magnetic core 20. First winding 22 is wrapped around first leg 24 to form $N_L$ turns. First winding 22 in combination with first leg 24 forms an inductor. As such, first winding 22 will alternatively be referred to as an inductor 22. Secondary winding 18a is also coupled to a first switch 26. In one embodiment, first switch 26 functions as a synchronous rectifier for the power converter 10. As such, first switch 26 may be employed to convert/rectify the AC signal generated on the secondary side of transformer 14 to a DC signal. In this embodiment, the first switch 26 may be a MOSFET switch. In alternate embodiments, however, switch 26 may be replaces or supplemented by a diode or other suitable rectification circuitry.

Secondary winding 18b is coupled to a first end of a second winding 28 that is wrapped around a second leg 30 of magnetic core 20. Second winding 28 is wrapped around second leg 30 to form $N_L$ turns. Second winding 28 in combination with second leg 30 forms an inductor. As such, second winding 28 will alternatively be referred to as an inductor 28. Secondary winding 18b is also coupled to a second switch 32. As will be described further below, second switch 32 may also be employed to convert/rectify the AC signal generated on the secondary side of transformer 14 to a DC signal. In alternate embodiments, switch 32 may be replaced or supplemented by a diode or other suitable rectification circuitry.

The second ends of both winding 22 and winding 28 are coupled together and coupled to a first end of a center winding 34, as indicated by reference numeral 35. Center winding 34 is wrapped around a center leg 36 of magnetic core 20 to form $N_c$ turns. Center leg 36, in the E-I core geometry, is placed in the window between the legs 24 and 30. Typically, it is preferred to place center leg 36 such that a part of center leg 36 is equidistant from legs 24 and 30 to achieve a relatively symmetric core geometry. However, depending on the application, center leg 36 can be placed anywhere in the window between legs 24 and 30. Center winding 34 in combination with center leg 36 forms an inductor. As such, center winding 34 will alternatively be referred to as inductor 34. As more clearly shown in FIG. 2 below, inductor 34 is arrayed in series with the junction of inductors 22 and 28.

As shown in FIG. 1, center leg 36 may include an air gap 38. As will be appreciated, air gap 38 stored majority of the inductor energy necessary for the operation of power converter 10. In particular, as air typically has lower permeance than the core material and cannot saturate, air gap 38 is able to limit the magnetic flux such that flux density in the magnetic core 20 below that saturation limit of the material. The air gap height should be chosen to achieve the required inductance while preventing core saturation. Increasing the air gap height to prevent core saturation results in reduced inductance and increased fringing flux. This flux can impinge on winding surfaces causing eddy currents, hence increased losses in the windings. The design of the air gap, thus involved multiple trade-offs in achieving a functioning inductor. Air gaps can be used in transformer cores, such as the core 15, as well to reduce the magnetizing inductance and increase the magnetizing current. Nonetheless, it will be appreciated that in alternate embodiments, air gap 38 may be omitted or replaced by another suitable energy storage component. This could be another material with a lower permeance and higher saturation limit than the material used for the remainder of the core. Further, in still other embodiments, air gaps and/or equivalent core materials may be inserted into legs 24 and 30 in place of or in addition to air gap 38.

Second end 39 of center winding 34, as shown in FIG. 1, may be coupled to a filter capacitor 40. Filter capacitor 40 may act in combination with inductors 22, 28, and 34 to form a filter capable of "smoothing" out a noisy DC signal created by switches 26 and 32 to create a smoother, less rippled DC output Vo 42. However, filter capacitor 40 may be omitted in some configurations.

Figure 2:
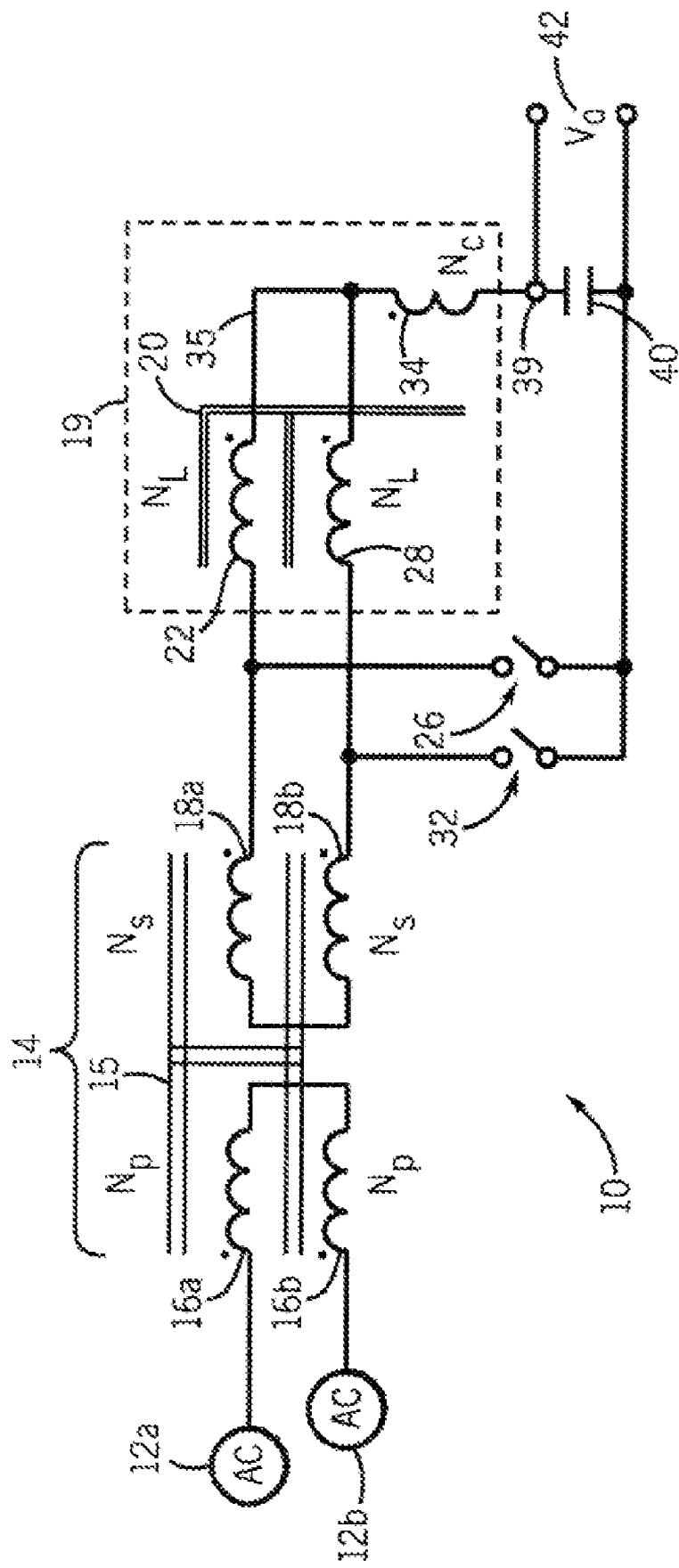
FIG. 2 is a schematic diagram of the exemplary isolated power converter of FIG. 1 in accordance with one embodiment.

FIG. 2 illustrates a schematic diagram of exemplary isolated power converter 10 of FIG. 1. In the schematic diagram, inductors 22, 28, and 34 are illustrated using the schematic symbol for an inductor and magnetic core 20 is illustrated using the schematic symbol for magnetic core. The schematic view in FIG. 2 more clearly shows the series relationship between inductor 34 with the junction of inductors 22 and 28.

Figure 3:
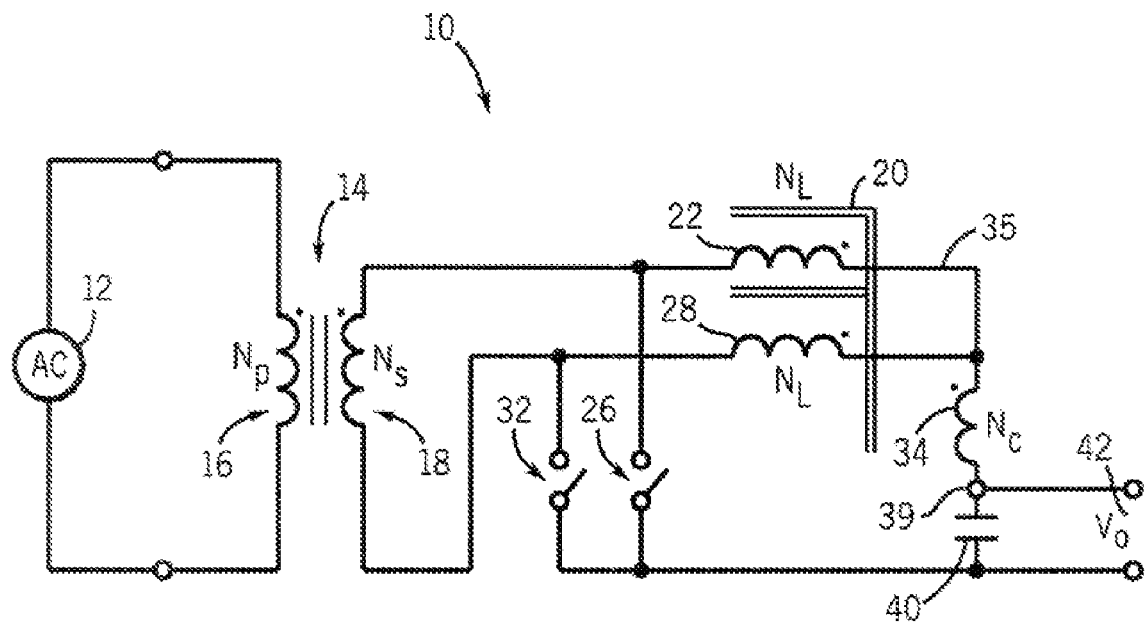
FIG. 3 is a schematic diagram of an alternate embodiment of an exemplary isolated power converter in accordance with one embodiment.

FIG. 3 illustrates an alternate embodiment of exemplary isolated power converter 10 of FIG. 1. In particular, in FIG. 3, shows a single AC source 12 that provides an AC signal that is a combination of the individual AC signals produced by AC sources 12a and 12b of FIGS. 1 and 2. Further, transformer 14 is depicted in FIG. 3 as including a single primary winding 16 and a single secondary winding 18 to transform the unified AC signal from AC source 12.

Figure 4:
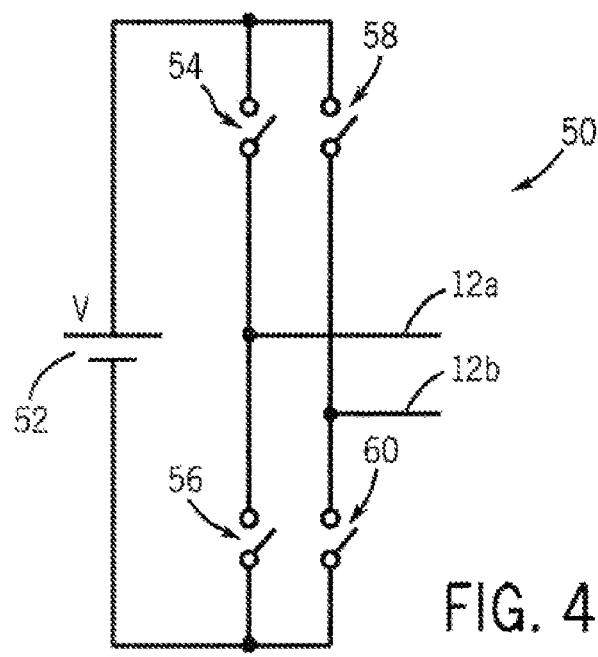
FIG. 4 is a schematic diagram of a full bridge converter in accordance with one embodiment.

As described above, AC source 12 may provide an AC signal to the primary side of transformer 14. In one embodiment, AC source 12 may receive this AC signal from another converter, such as full bridge converter 50 that is illustrated in FIG. 4 in accordance with one embodiment. Although the discussion below will focus on embodiments converting a quasi-square wave AC signal generated by full bridge converter 50, it will be appreciated that full bridge converter 50 is only one exemplary system for generating an appropriate AC signal. As such, in alternate embodiments, AC signal may be received from other suitable sources, including, but not limited to half-bridge converter, push-pull converters, multi-level converters, public utilities, AC generators, other transformers, and the like.

Figure 6:
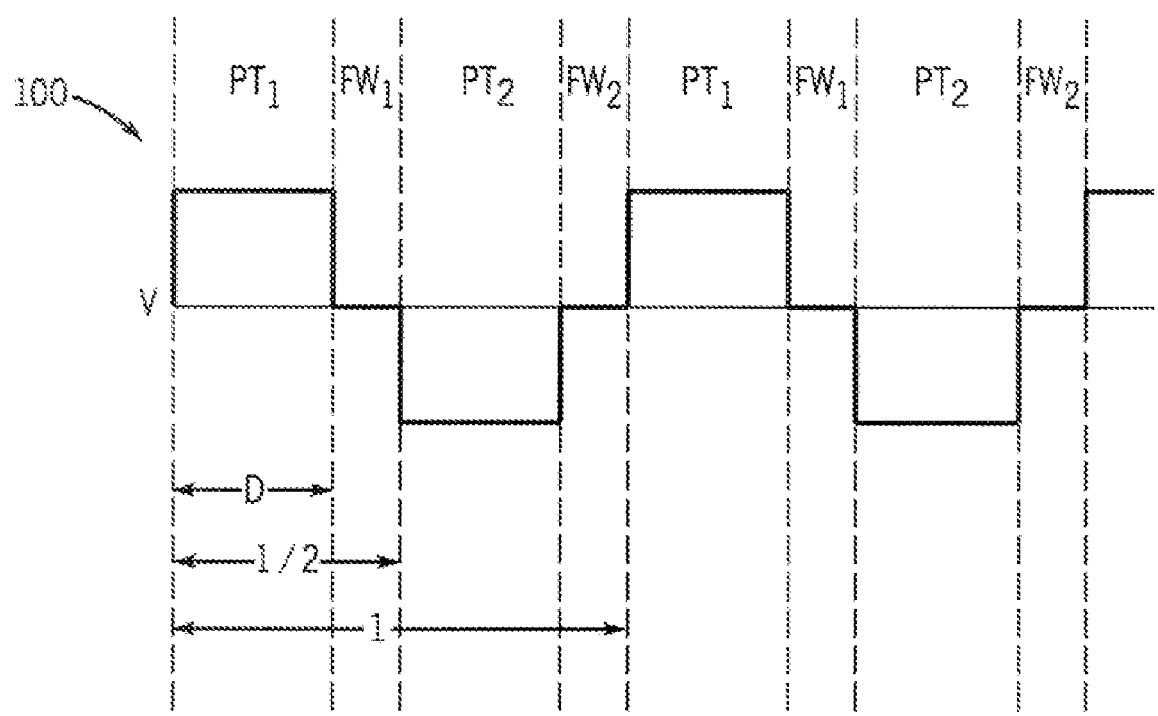
FIG. 6 illustrates an exemplary quasi-square wave in accordance with one embodiment.

Full bridge converter 50 includes a DC source 52. In one embodiment, DC source 52 may comprise an AC rectifier configured to generate a DC signal from an incoming AC signal. DC source 52 may be coupled to four switching devices 54, 56, 58, and 60. In one embodiment, switching devices 54, 56, 58, and 60 comprise MOSFET switches. In operation, switching devices 54-60 may be gated to produce an AC signal that is a symmetrical quasi-square wave (i.e., a square wave with the dead time). An exemplary quasi-square wave is depicted in FIG. 6 and described further below.

Figure 5:
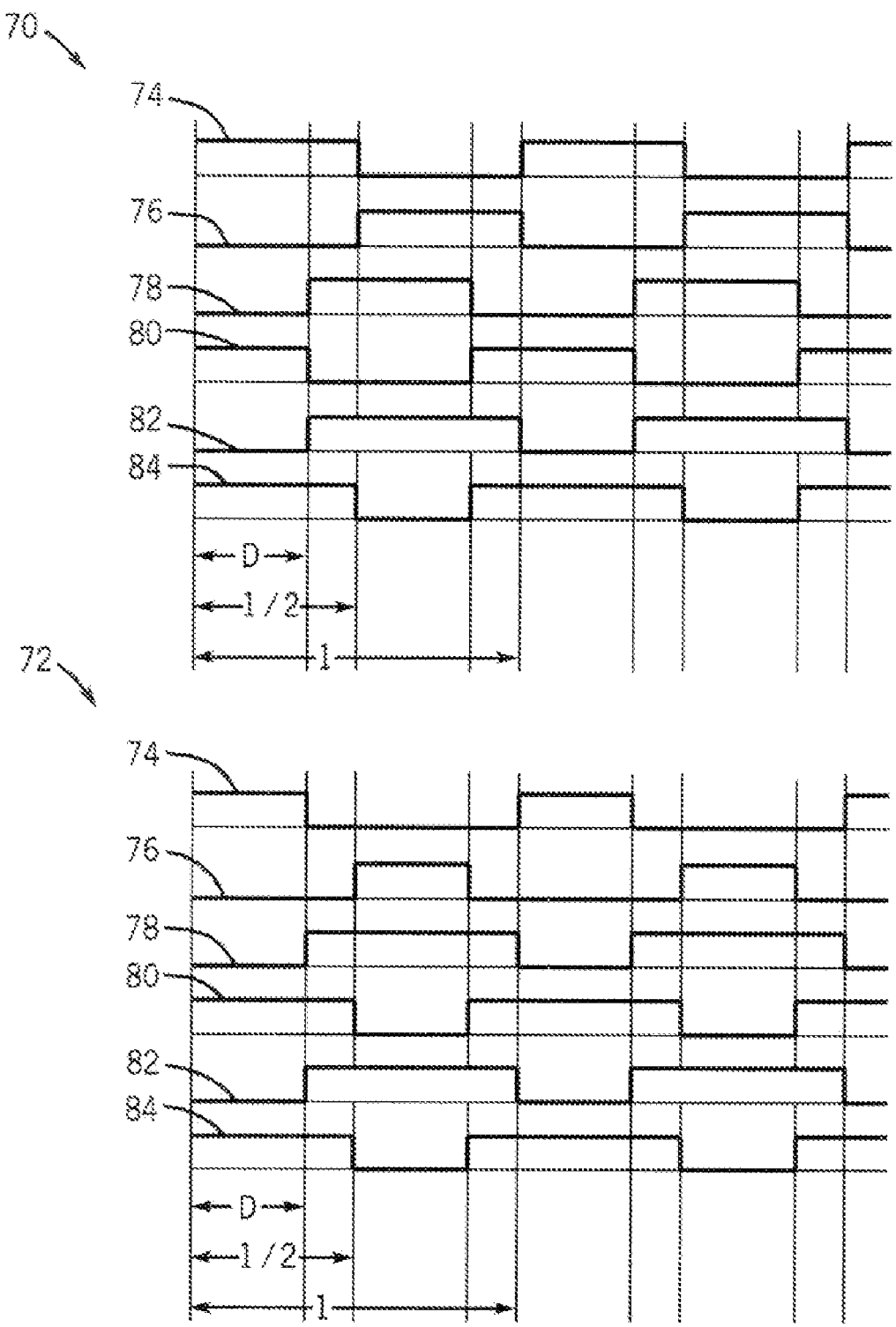
FIG. 5 illustrates two exemplary timing diagram for the switching devices of FIG. 4 that enable the generation of a quasi-square wave AC input suitable for the power converter of FIG. 1 in accordance with one embodiment.

FIG. 5 illustrates two exemplary timing diagrams 70 and 72 for switching devices 54-60 of FIG. 4 that enable the generation of quasi-square wave AC input for power converter 10. More specifically, FIG. 5 shows a gating pattern 74 for switching device 54, a gating pattern 76 for switching device 56, a gating pattern 78 for switching device 58, and a gating pattern 80 for switching device 60. In addition, timing diagrams 70 and 72 also include gating patterns 82 and 84 that may be employed to control switching devices 26 and 32 (see FIG. 1) to convert the quasi-square wave signal of FIG. 6 into a DC signal.

Both timing schemes depicted in diagrams 70 and 72 result in same voltage ratio (input voltage/output voltage) for power converter 10. This ratio is given by the equation:

$$\frac{V_o}{V_{in}} = D\frac{N_a}{N_p} \quad \text{(Equation 1)}$$

where Vo is the output voltage, Vin is the input voltage, and D is the duty cycle. In the timing diagram 70, the duty cycle for gating patterns applied to switching devices 54, 56, 58, and 60 is 50%. The duty cycle D that determines the input-output voltage ratio is related the phase shift between the gating signals shown in timing diagram 70 applied to each left of full bridge converter 50. On the other hand, in timing diagram 72, switching devices 54 and 58 are gated with duty cycle D while switching devices 56 and 60 are gated with duty cycle 1-D. Further, as shown, switches 26 and 32 (i.e., the secondary side synchronous rectifiers) are gated with duty cycle 1-D in both timing diagram 70 and timing diagram 72.

The voltage across primary winding 16, synthesized according to either of the timing diagrams shown in FIG. 5, is quasi-square wave 100 shown in FIG. 6. From FIG. 6, it can be seen that quasi-square wave 100 and thus power converter 10 goes through four distinct stages over a single switching period. These four stages are referred to as the Power Transfer ("PT") 1 stage, the Free-Wheeling ("FW") 1 stage, the PT2 stage and the FW2 stage. During stages PT1 and PT2, power is transferred to output 42 from the input across transformer 14, because the AC signal at secondary windings 18 has an absolute value greater than zero. On the other hand, during stages FW1 and FW2, the energy stored in inductors 22, 28, and 34 is transferred to output 42, because the AC signal at secondary windings 18 is at zero volts.

Figure 7:
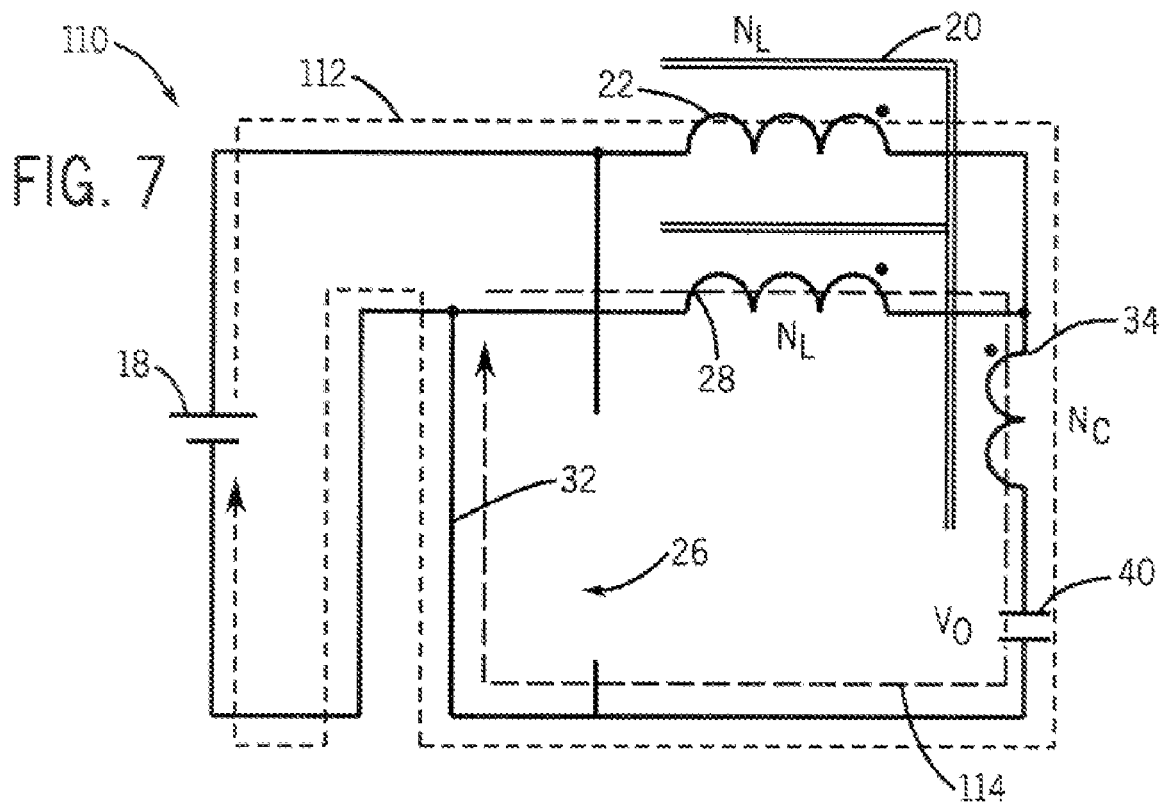
FIG. 7 is a schematic representation of an equivalent circuit for the secondary side of the power converter of FIG. 1 during the stage PT1 in accordance with one embodiment.
Figure 8:
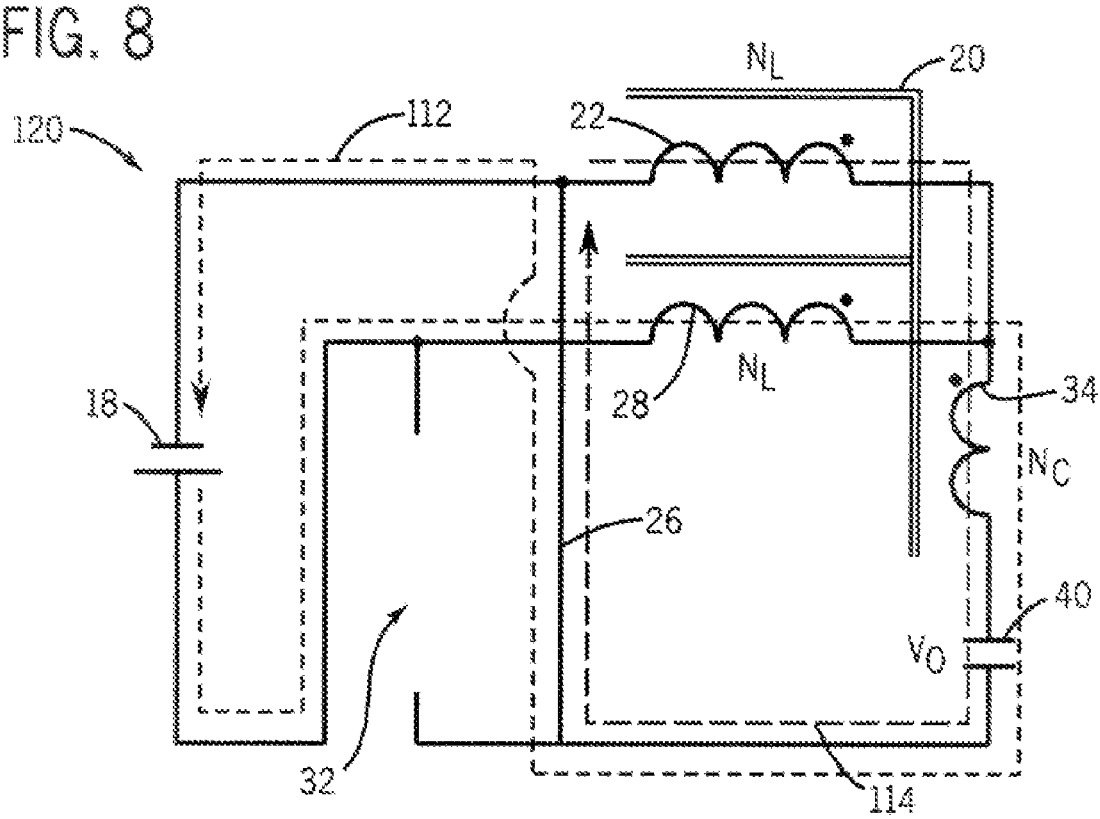
FIG. 8 is a schematic representation of an equivalent circuit for the secondary side of the power converter of FIG. 1 during the PT2 in accordance with one embodiment.
Figure 9:
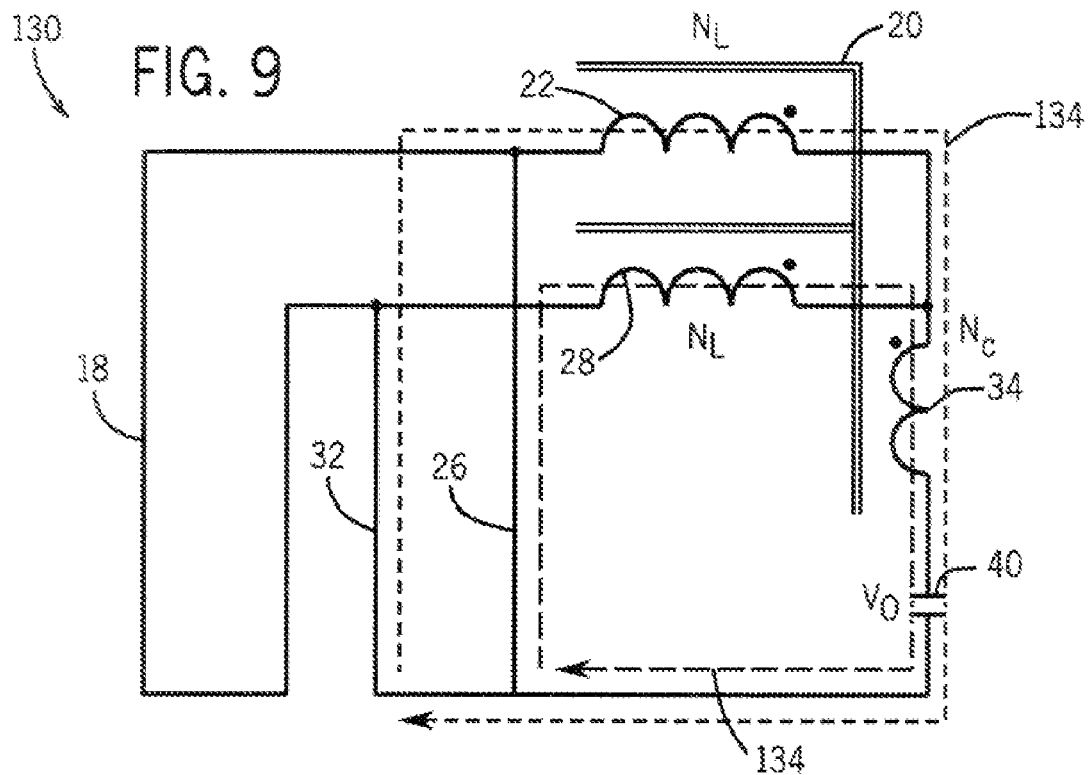
FIG. 9 is a schematic representation of an equivalent circuit for the secondary side of the power converter of FIG. 1 during the stages FW1 and FW2 in accordance with one embodiment.

FIGS. 7-9 illustrate equivalent circuits and current directions for the secondary side of power converter 10 during each stage of operation over the switching period that are presented in FIG. 6. For example, FIG. 7 shows a schematic representation of an equivalent circuit 110 during the stage PT1 in accordance with one embodiment. In equivalent circuit 110, secondary windings 18 are illustrated as a DC power source, because a DC source is equivalent of the AC signal generated on secondary windings 18 during the PT1 stage (see FIG. 6). Switch 26 is an open state during the PT1 stage, and is, thus, illustrated in FIG. 7 by a gap in the circuit (i.e., the equivalent of an open switch). Switch 32 is closed during PT1, so switch 32 is replaced in equivalent circuit 110 by a wire (i.e., the equivalent of a close switch). During the stage PT1, current 112 flows from secondary winding 18 through filtering capacitor 40 and through switching device 32. Likewise, current 114 also flows through filtering capacitor 40. Inductor 22 is charged with current 112, while inductor 24 freewheels current 114 through the output and switch 32. The sum of the currents 112 and 114 charges inductor 34.

The equivalent circuit 120 of FIG. 8 shows the secondary side of power converter 10 during the PT2 in accordance with one embodiment. As shown, similar to the PT1 stage, during the PT2 stage, current 112 flows from secondary side through filtering capacitor 40. Because during PT2 stage, quasi square wave 110 is negative, and, thus, current 112 flows in opposite direction in equivalent circuit 120 than it did in equivalent circuit 110. However, because gating patterns 82 and 84 for switches 26 and 32 are synchronized with positive and negative swings of quasi square wave 110, current 112 and current 114 both still flow through filtering capacitor 40 in the same direction during PT2 as they did during PT1 (see FIG. 8). In this way, switches 26 and 32 enable the conversion of the AC input signal to a DC output signal. Further, during the PT2 stage, inductor 24 is charged with current 114, while inductor 22 freewheels current 112 through the output and switch 26. The sum of the currents 112 and 114 charges inductor 34.

When power converter 10 is in the FW1 and FW2 stages, the energy stored in inductors 22, 28, and 34 is transferred to the filtering capacitor 40 through the freewheeling current. The transference is illustrated in FIG. 9, which shows an equivalent circuit 130 during the FW1 and FW2 stages in accordance with one embodiment. In equivalent circuit 130, secondary windings 18 are replaced by a wire, as quasi-square wave 130 is at zero volts during the FW1 and FW1 stages. Inductors 22, 28, and 34 transfer their stored energy to the load(from the PT1 and PT2 stages) through freewheeling currents 132 and 134 (both currents are numbered 134 in FIG. 9), which flow in the same direction towards the filtering capacitor 40 as currents 112 and 114 in FIGS. 7 and 8. It should be noted that there will be progressively legs ripple in the DC output as the combined inductance of inductors 22, 28, and 34 increases and/or the capacitance of filtering capacitor 40 increases. However, large inductors and large capacitor are expensive both in cost and size. As will be described in greater detail below, one of the advantages of power converter 10 is that center leg inductor 34 provides an increase in the total available inductance enabling relatively smaller inductors 22 and 28 and/or a smaller filtering capacitor 40 to be employed.

The design of power converter 10 may provide several advantages over and above conventional topologies. These advantages include: (1) reduced switching ripple in the flux density in first and second legs 24 and 30, which results in reduced core losses; and (2) increased inductance due to center leg winding 34 resulting in reduced switching ripple in the output current. This reduced switching ripple can enable filtering capacitor 40 to have a lower capacitance value, which equates to a smaller sized capacitor than conventional isolated power converters. Power converter 10 may also provide a wider stability region for peak current mode control before sub-harmonic oscillations occur in the inductor currents.

The flux density switching ripple in legs 24 and 30 and center leg 36 for power converter 10 is given by the following equation:

$$\Delta B_L = \frac{N_L + \frac{N_C}{1-D}}{N_L + 2N_C} \frac{V_o}{N_L} \frac{1-D}{f_s} \frac{1}{A_L}$$ (Equation 2)

$$\Delta B_C = \frac{V_o}{N_L + 2N_C} \frac{1-2D}{f_s} \frac{1}{A_C}$$

where $\Delta B_L$ is the flux density of legs 24 and 30, $\Delta B_C$ is the flux density of center leg 32, $f_x$ is the switching frequency, $A_L$ is the cross sectional area of legs 24 and 30, and $A_c$ is the cross-sectional area of center leg 36. It can be seen from Equation 2, that center leg winding 34 reduces the flux density ripple in both legs 24 and 30 and center leg 36 resulting in reduced core loss and higher efficiency power conversion.

The effective filter inductance seen by a load of power converter 10 is given by the equation:

$$L_{feq} = \frac{(N_L + 2N_C)^2}{R_L + 2N_C}$$ (Equation 3)

As such, if $N_L=3$, for example, the effective filter inductance in power converter 10 can be increased by a factor of 2.8 by using a single turn center leg winding 34 (i.e., $N_c$) over a conventional power converter lacking center leg inductor 34. Moreover, because this increase in inductance comes while using a standard E-I core, magnetic core 20 may occupy no more additional space in power converter 10 than the standard E-I core with reduced inductance would have in conventional systems.

Figure 10:
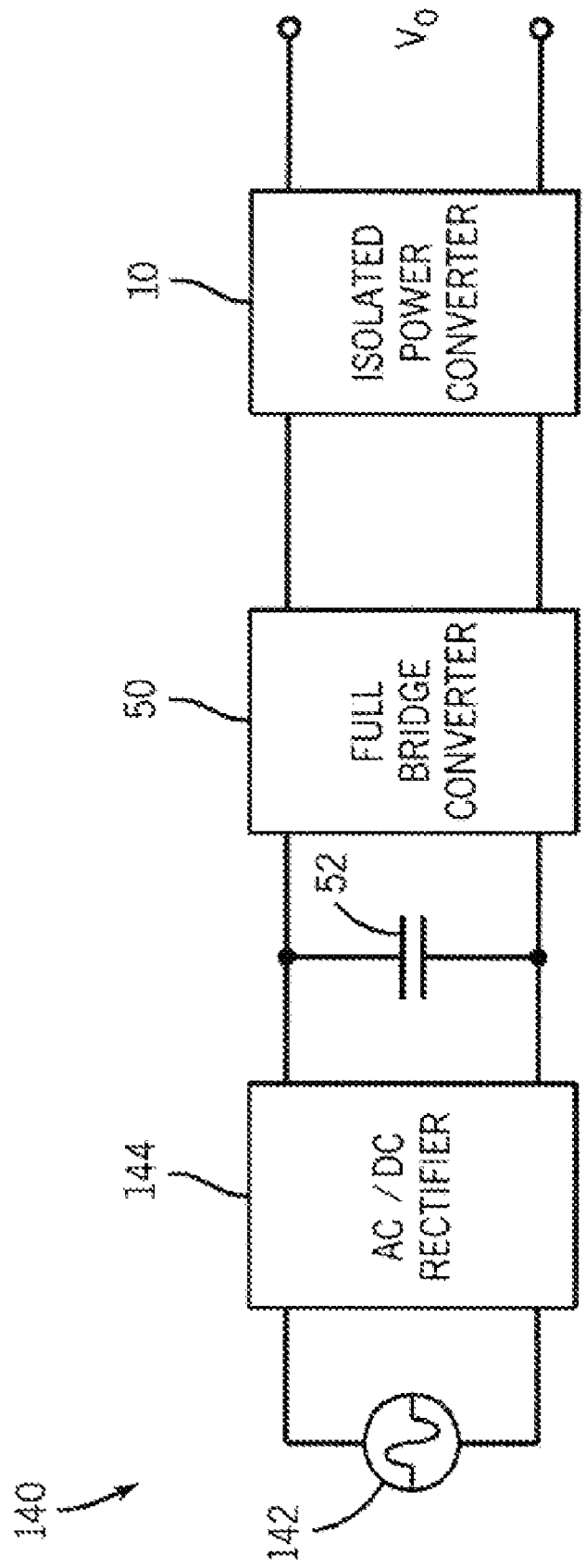
FIG. 10 is a block diagram of an exemplary power conversion system employing the isolated power converter of FIG. 1 in accordance with one embodiment.

FIG. 10 illustrates an exemplary power conversion system 140 employing the isolated power converter 10 in accordance with some embodiments. System 140 includes an AC source 142, which in one embodiment comprises a connection to a 120 volt AC power signal provided by a public utility or a private generator. System 120 may be coupled to AC/DC rectifier 144 which is configured to rectify the AC power signal provided by AC source 142 into a generally DC signal. AC/DC rectifier 144 may be coupled to full bridge converter 50, which is coupled to isolated power converter 10, as described above with regard to FIGS. 1-9. It will be appreciated that system 140 illustrates merely one embodiment of a power conversion system that employs power converter 10. As such, in alternate embodiments, other suitable power conversion systems may employ power converter 10.

Figure 11:
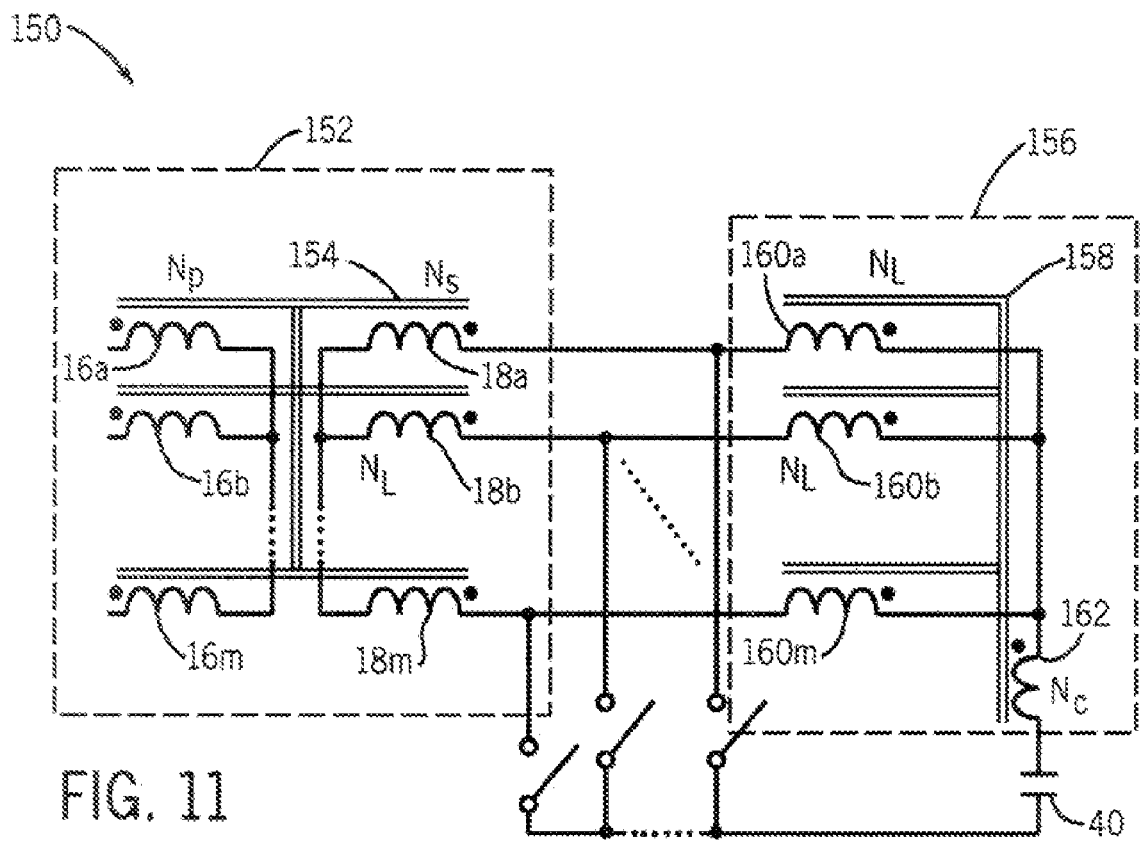
FIG. 11 is a schematic diagram of a generalized exemplary m-phase power converter based on a full bridge topology on the primary side in accordance with one embodiment.

The two phase systems employed in power converter 10 can be extended to any suitable number of phase to accommodate higher power levels, tighter ripple, and/or reduced size requirements. A generalized exemplary m-phase power converter 150 based on a full bridge topology on the primary side is shown in FIG. 11 in accordance with one embodiment. As illustrated, power converter 150 features an m-phase isolation transformer 152. Transformer 152 may include a magnetic core 154 and primary side windings 16 and secondary side windings 18 for each of the m phases of the input AC signals employed. It will be understood that m may be any integer value greater than 2. For example, in various embodiments, m could have a value of 2, 3, 4, 5, 6, 7, 8, 9, and so forth. A representation of one configuration of transformer 152 illustrated in FIG. 12 in accordance with one embodiment.

Transformer 152 is coupled to an inductor assembly 156. In one configuration, inductor assembly 156 may include a magnetic core 158, windings 160a-160m, and center leg winding 162. Like magnetic core 20 described above, magnetic core 158 may be comprised of any suitable core material, such as ferrite, steel, or iron. As shown in the FIG. 12, in one embodiment, magnetic core 158 may have a plurality of legs 164 upon which windings 160a-160s are wrapped with one winding per phase of the input AC signal. Magnetic core 156 may also include a center leg 166 around which center leg winding 162 is wrapped. It will be appreciate that the center leg 166 around which the center leg winding 162 is wrapped includes electrically equivalents of the structure. For example, the center leg around which the center leg winding 162 is wrapped could be a plurality of center legs 166 having a plurality of center legs windings 162 arrayed in series a parallel with each other.

Figure 12:
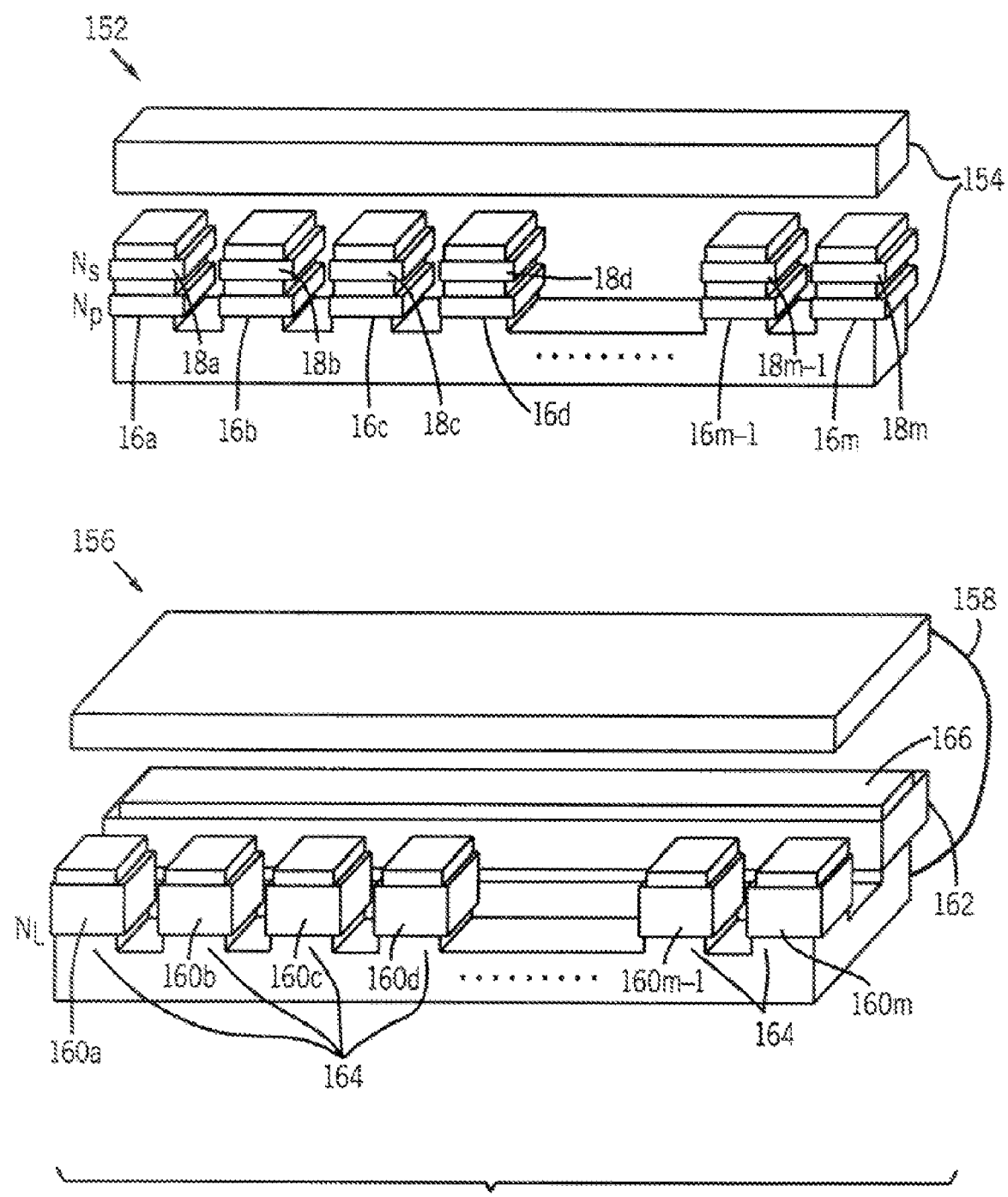
FIG. 12 shows a representation of an exemplary multiphase transformer and multiphase inductor assembly suitable for use with the power converter of FIG. 11 in accordance with one embodiment.

FIG. 12 illustrates one embodiment of a suitable design for center leg 166. However, it will be appreciated that in alternate embodiments, other suitable configurations for magnetic core 158 may be employed as long as a part of center leg 166 is equidistant or generally equidistant from each of the plurality of legs 164 that have windings 160 or the center leg 166 is located such that the flux paths from the legs 164 to the center leg 166 are almost symmetrical.

Power converter 150 may also include filter capacitor 40, which functions substantially similar to the way that if functioned in power converter 10. Finally, power converter may include a plurality of synchronous rectification switches 170 configured to rectify the AC input signal (e.g., quasi-square wave 110) to create a DC signal.

Figure 13:
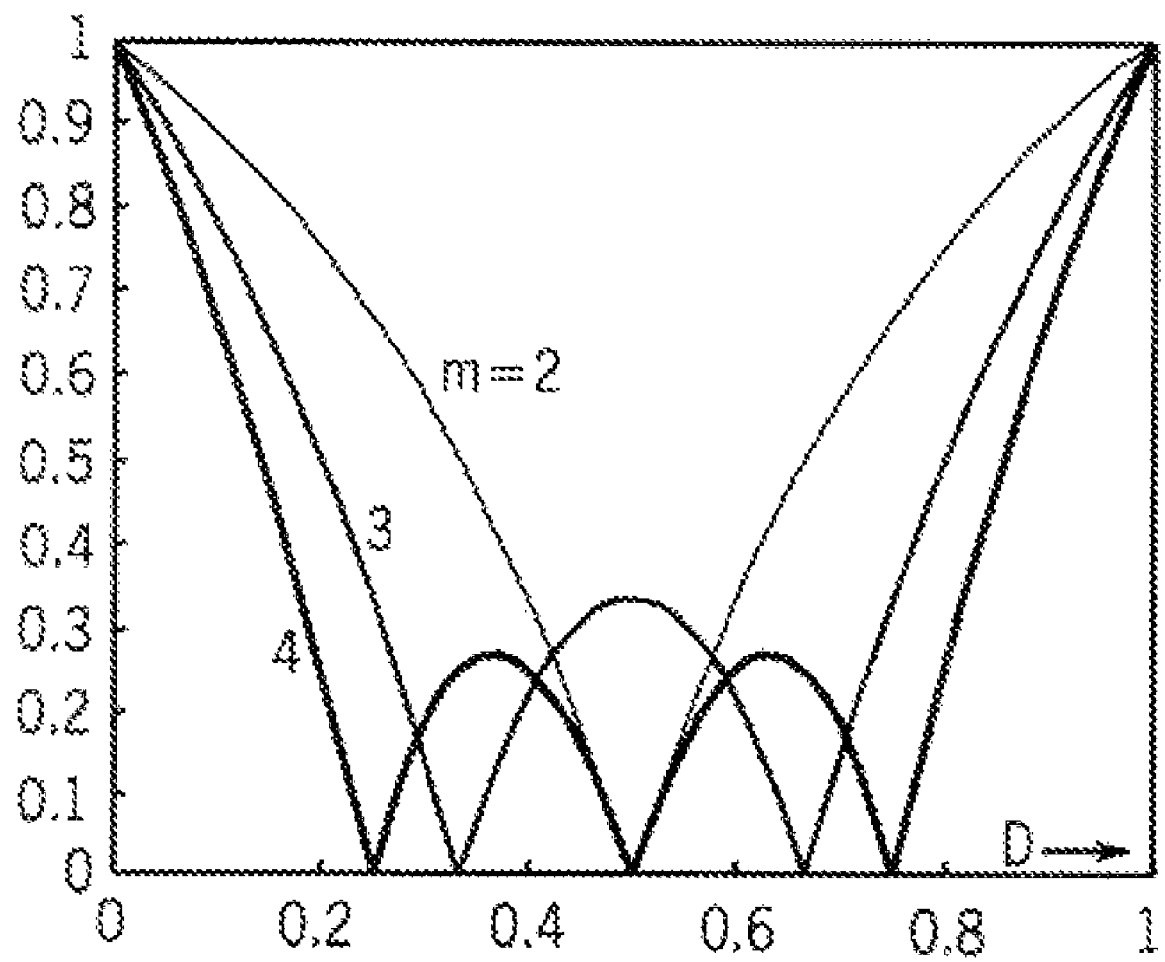
FIG. 13 is a chart showing the peak to peak switching ripple in the output current for values of m=2, m=3, and m=4 in the power converter of FIG. 11 in accordance with one embodiment.

If the phase angles of the AC input signals in power converter 150 are shifted in phase from each other by 360 degrees divided by m or shifted from each other in time by $T_s$ divided by m, the peak to peak switching ripple in the output current of power converter 150 will vary inversely with the value of m. For example, if m=2 (two-phase interleaving), the AC input signals (and thus currents 112 and 114) are shifted in phase by half the switching period while for three-phase interleaving (m=3), the phase shift is a third of the switching period. FIG. 13 is a chart showing the peak to peak switching ripple in the output current for values of m=2, m=3, and m=4 in power converter 150 in accordance with one embodiment. As illustrated, as m increases (i.e., as the number of interleaved AC signals increases), the ripple in the output current decreases.

In various other embodiments, there are also provided methods for manufacturing power converter 10 and/or power converter 150. For example, in one embodiment, there is provided a method of manufacturing a power converter including providing a magnetic core 20 with at least three legs 24, 30, and 36, wherein a part of leg 36 is equidistant to remaining legs 24 and 30. The method also includes wrapping a winding 22, 28, and 34 around each of legs 24, 30, and 36, coupling windings 34 around equidistant leg 36 in series to the junction of each of windings 24 and 30 around each of remaining legs 24 and 30, and coupling windings 22 and 28 around each of remaining legs 24 and 30 to the secondary side of transformer 14. This method may also include coupling a capacitor 40 to winding 34 around equidistant leg 36, coupling a rectification component 26, 32 to the winding the second side of the transformer, and/or coupling a primary side of the transformer to an AC source 12.

It will be seen by those skilled in the art that many embodiments taking a variety of specific forms and reflecting changes, substitutions, and alternations can be made without departing from the spirit and scope of the invention. Therefore, the described embodiments illustrate but do not restrict the scope of the claims.

What is claimed is:

1. A power converter comprising:
   a first magnetic core having a primary winding and a secondary winding around the first magnetic core;
   a second magnetic core comprising:
   a first leg;
   a second leg coupled to the first leg; and
   a third leg coupled to the first and second legs, wherein a part of the third leg is equidistant from the first leg and the second leg;
   a first winding encircling the first leg, a first end of the first winding coupled to the secondary winding;
   a second winding encircling the second leg, a first end of the second winding coupled to the secondary winding; and
   a third winding encircling the third leg, a first end of the third winding coupled to a second end of the first winding and to a second end of the second winding.

2. The power converter of claim 1, comprising a capacitor coupled to a second end of the third winding.

3. The power converter of claim 1, wherein the second magnetic core comprises a fourth leg coupled to the first and second legs, wherein the part of the third leg is equidistant from the first, second, and fourth legs.

4. The power converter of claim 3, comprising a fourth winding encircling the fourth leg, wherein a first end of the fourth winding is coupled to the secondary winding and a second end of the fourth winding coupled to the third winding.

5. The power converter of claim 1, wherein the power converter comprises an AC/DC converter.

6. The power converter of claim 1, comprising an AC source coupled to the primary winding.

7. The power converter of claim 6, wherein the AC source is configured to generate a quasi-square wave AC on the primary winding.

8. The power converter of claim 6, wherein the AC source comprises a full bridge converter.

9. The power converter of claim 6, wherein the AC source is configured to generate two AC signals out-of-phase from each other.

10. The power converter of claim 1, comprising:
    a first rectification component coupled to the first end of the first winding; and
    a second rectification component coupled to the first end of second winding.

11. The power converter of claim 10, wherein the first rectification component comprises a MOSFET switch.

* * * * *

UNITED STATES PATENT AND TRADEMARK OFFICE
CERTIFICATE OF CORRECTION

| | |
|---|---|
| PATENT NO. | : 7,468,649 B2 |
| APPLICATION NO. | : 11/686140 |
| DATED | : December 23, 2008 |
| INVENTOR(S) | : Chandrasekaran |

It is certified that error appears in the above-identified patent and that said Letters Patent is hereby corrected as shown below:

Title Page, Section (56) References Cited, OTHER PUBLICATIONS, 2nd entry, delete "nanocmposites" and insert --nanocomposites--.

On the Title Page, Section (57) ABSTRACT, line 14, delete "wining" and insert --winding--.
In Col. 1, line 44, delete "fired" and insert --first--.
In Col. 1, line 62, delete "diagram" and insert --diagrams--.
In Col. 2, lines 34-35, delete "alternative" and insert --alternate--.
In Col. 2, line 36, after of delete "the".
In Col. 2, line 43, after sawtooth delete "a".
In Col. 3, line 36, after i.e., insert --an--.
In Col. 3, line 56, delete "replaces" and insert --replaced--.
In Col. 4, line 19, delete "stored" and insert --stores--.
In Col. 4, line 24, after 20 insert --is--.
In Col. 4, line 24, delete "that" and insert --is--.
In Col. 4, line 30, delete "involved" and insert --involves--.
In Col. 4, line 47, delete "Vo" and insert --$V_o$--.
In Col. 4, line 53, after for insert --a--.
In Col. 5, line 19, after with delete "the".
In Col. 5, line 37, Equation 1, delete "$N_a$" and insert --$N_s$--.
In Col. 5, line 42, delete "Vo" and insert --$V_o$--.
In Col. 5, line 42, delete "Vin" and insert --$V_{in}$--.
In Col. 5, line 46, after related insert --to--.
In Col. 5, line 47, delete "left" and insert --leg--.
In Col. 6, line 10, before an insert --in--.
In Col. 6, line 14, delete "close" and insert --closed--.
In Col. 6, line 29, after with insert --the--.
In Col. 6, line 45, delete "and FW1" and insert --and FW2--.
In Col. 6, line 51, delete "legs" and insert --less--.
In Col. 7, line 19, delete "ΔBc" and insert --$\Delta B_c$--.
In Col. 7, line 20, delete "$f_x$" and insert --$f_s$--.
In Col. 7, line 31, Equation 3, delete "$L_{feq}$" and insert --$L_{f,eq}$--.
In Col. 7, line 59, delete "systems" and insert --system--.
In Col. 7, line 60, delete "phase" and insert --phases--.

UNITED STATES PATENT AND TRADEMARK OFFICE
CERTIFICATE OF CORRECTION

PATENT NO. : 7,468,649 B2
APPLICATION NO. : 11/686140
DATED : December 23, 2008
INVENTOR(S) : Chandrasekaran It is certified that error appears in the above-identified patent and that said Letters Patent is hereby corrected as shown below:

In Col. 8, line 5, after 152 insert --is--.
In Col. 8, line 17, delete "appreciate" and insert --appreciated--.
In Col. 8, line 22, delete "a" and insert --or--.
In Col. 10, line 8, before coupled insert --is--.
In Col. 10, line 15, after AC insert --signal--.

Signed and Sealed this

Third Day of March, 2009

JOHN DOLL
*Acting Director of the United States Patent and Trademark Office*